United States Patent [19]

Tsai

[11] Patent Number: 4,898,119

[45] Date of Patent: Feb. 6, 1990

[54] REMOTE CONTROL ANIMAL COLLAR

[76] Inventor: David M. Tsai, 124 Benedict La., Raleigh, N.C. 27614

[21] Appl. No.: 230,957

[22] Filed: Aug. 11, 1988

[51] Int. Cl.⁴ ............................................. A01K 15/00
[52] U.S. Cl. ..................................... 119/29; 119/106; 340/825.69
[58] Field of Search .................... 119/29, 96, 106, 109, 119/110; 54/1, 69, 71; 340/825.69, 573; 318/16; 128/883, 885, 886

[56] References Cited

U.S. PATENT DOCUMENTS

| | | | |
|---|---|---|---|
| 2,821,169 | 1/1958 | Barnhorst | 119/110 |
| 3,099,250 | 7/1963 | Soles Jr. | 119/106 |
| 3,505,979 | 4/1970 | Rosswag | 119/110 |
| 3,699,578 | 10/1972 | Fiorentino | 318/16 X |
| 3,732,570 | 5/1973 | Fiorentino | 318/16 X |
| 3,733,530 | 5/1973 | Labart et al. | 318/16 |

Primary Examiner—Robert P. Swiatek
Assistant Examiner—R. Thomas
Attorney, Agent, or Firm—James J. Brown

[57] ABSTRACT

An animal training collar is described which is remotely controlled so that the collar can be tightened or released from a remote location by the master. The collar contains a small electric motor, power source, radio receiver and clutch mechanism for transmitting rotational force to a capstan which winds in leads attached to the collar on receipt of the appropriate signal from a transmitter.

10 Claims, 5 Drawing Sheets

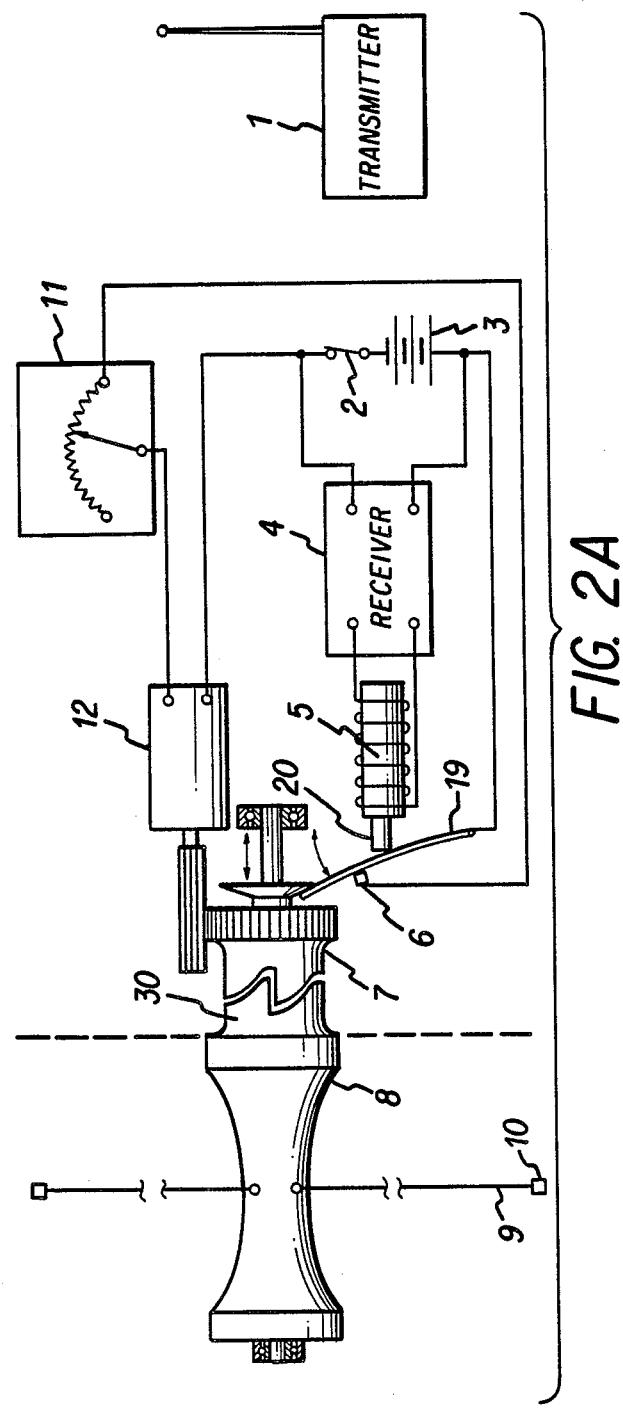
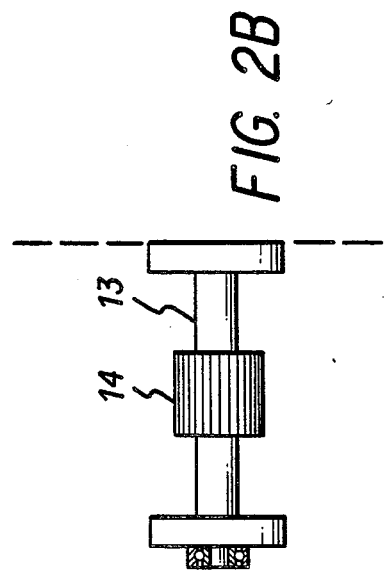
FIG. 2A
FIG. 2B

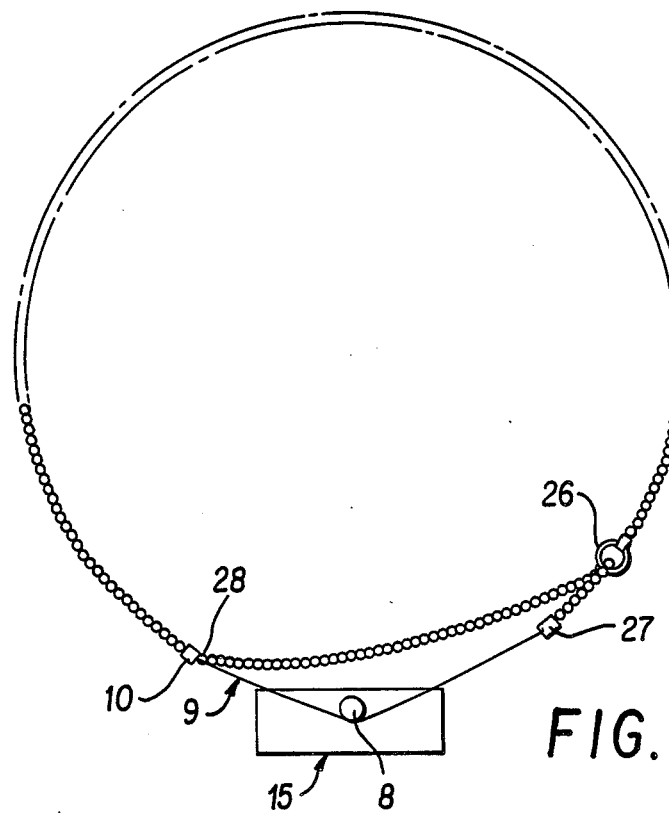
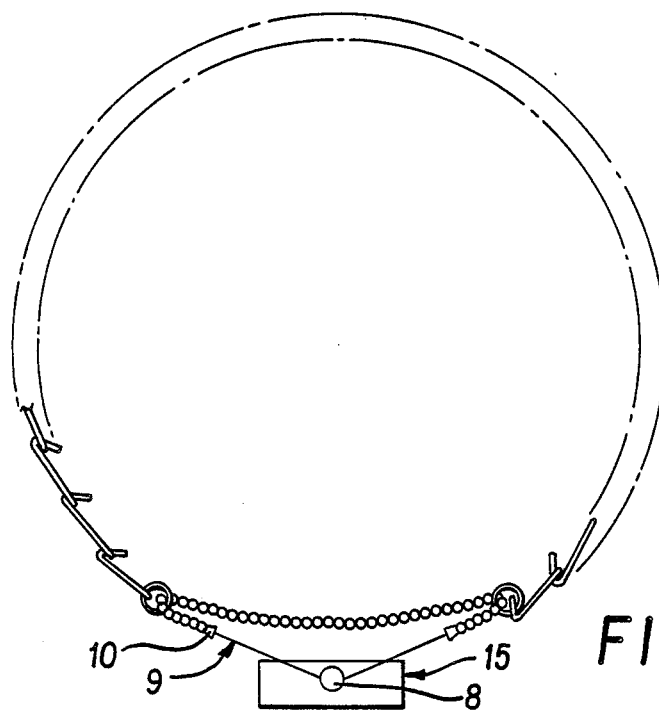

REMOTE CONTROL ANIMAL COLLAR

SUMMARY OF THE INVENTION

The present invention is directed to an animal training collar which encircles the neck of the animal and is provided with a mechanism for tightening or relaxing the collar around the neck of the animal in response to a remotely transmitted signal.

BACKGROUND OF THE INVENTION

The training of animals, and in particular dogs, so that they will obediently respond to vocal commands is often accomplished by means of leashes and collars which permit the transmission of physical force in one form or another to the animal in conjunction with the vocal commands. For example, choke chains have commonly been employed for this purpose and are attached to a leash so that the choke chain around the neck of the animal can be tightened or relaxed in accordance to the animal's response to the given command. Such devices however have the disadvantage that they require the human master to be in fairly close proximity to the animal since it is impractical for the leash to be of any great length.

To provide a remote signal which is not dependent upon the length of a leash, it has been proposed to provide various radio controlled devices which produce shock or other potentially harmful or misunderstood stimulation to the animal. Such devices of the prior art are illustrated and described in the following United States Patents:

U.S. Pat. No. 3,589,337 to Doss describes an animal training device which may be collar or harness which provides an electric shock to the animal in response to a remotely transmitted radio signal.

U.S. Pat. No. 3,733,530 to Labart, et al. describes a bucking strap to be used on a bucking horse or Brahma bull in a rodeo to permit a judging official to remotely disconnect the strap.

U.S. Pat. No. 4,180,013 to Smith describes an animal behavior control device which produces a vibration on the animal's neck in response to barking or other noise emitted from the animal itself.

U.S. Pat. No. 4,651,678 to Kime describes a device for controlling the reins, crop or spurs applied to a riding horse which device is controlled by radio to simulate the actions of a jockey.

It is an object of the present invention to provide an improved, remotely controlled training collar for animals and in particular dogs which permits the gentle, repetitive application of pressure to the neck of the animal through the attached collar and which simulates the same type of pressure applied to a collar by a leash to thereby familiarize the animal with the restraints associated with the normal use of a collar and leash of conventional design.

It is a further object of the present invention to provide an animal training collar which permits tightening or loosening of the collar at a remote distance from the animal being trained so that the animal is familiarized with the need to respond obediently to given commands irrespective of the proximity of the animal's master.

BRIEF DESCRIPTION OF THE DRAWINGS

FIG. 2 is a schematic drawing of the device of the present invention including two alternative capstan structures but omitting the actual collar strap.

FIG. 6 is a cutaway side view illustrating the capstan drive of another embodiment of the invention.

FIG. 7 illustrates the capstan drive in use with a pinched collar.

DETAILED DESCRIPTION OF THE INVENTION

In accordance with the present invention an adjustable animal training collar is provided which comprises a flexible strap at least a portion of which encircles the neck of an animal such as a dog and which can be tightened or loosened around the animal's neck in response to a radio signal transmitted from a remote location to the device. A radio receiver for receiving the remotely broadcast radio signal is provided on the collar and converts the received signal to an on-off switching signal. An electric power source such as a small battery is also provided in the unit to provide the necessary electric power to drive a small electric motor which in turn provides rotational power through its shaft to a capstan. A solenoid switch is activated by the signal received from the radio receiver and activates a clutch mechanism to thereby cause actual transmission of rotary power from the electric motor shaft to the capstan and to close a switch in the circuit which transmits electric power to the motor. The capstan in turn is connected to the flexible strap around the neck of the animal in such a way that turning of the capstan by the electric motor produces a tightening of the collar around the neck of the animal. When the signal transmitted to the radio receiver is discontinued or alternatively a negative signal is received, the solenoid relaxes thereby causing the clutch to disengage and the capstan to stop turning. To permit a variable rate of tightening of the collar, which may be required for animals having significantly larger or smaller necks, a rheostat is conveniently provided between the electric power source and the electric motor so that the speed of revolution of the electric motor shaft can be adjusted.

The details and various embodiments of the present invention will however be more completely appreciated by having reference to the drawings provided herein which are illustrative of the invention in its preferred embodiments.

Figure 1:
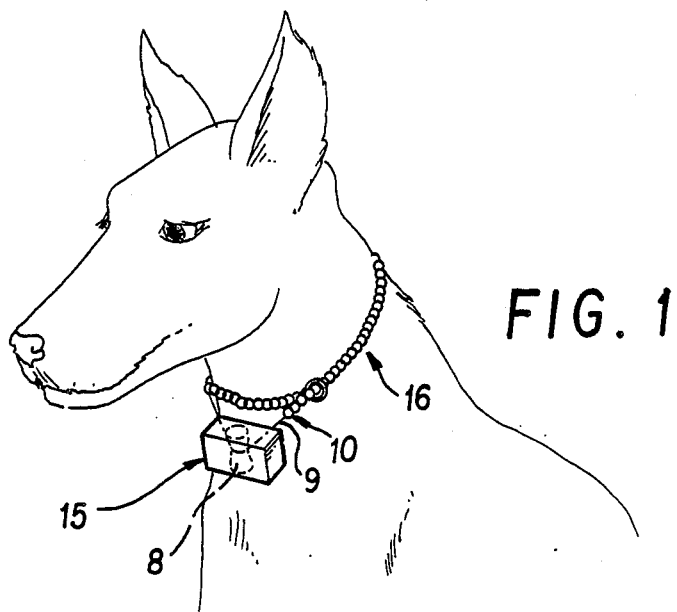
FIG. 1 illustrates the head and neck of a dog with one embodiment of the present invention attached around it's neck.

Directing attention first of all to FIG. 1, it will be seen that the neck of the illustrated animal is encircled by a flexible collar or strap 16 which in this case is a choke chain. The mechanism of the present invention while not illustrated in this drawing, including the power source, electric motor, receiver, activation switches and clutch mechanism are all contained within the case 15 attached to the collar under the animal's chin. Connectors 10 are attached to cables 9 which in turn encircle the capstan 8 so that turning of the capstan winds the cables around it and decreases the circumference of the chain 16 thereby applying pressure to the neck of the animal.

Figure 4:
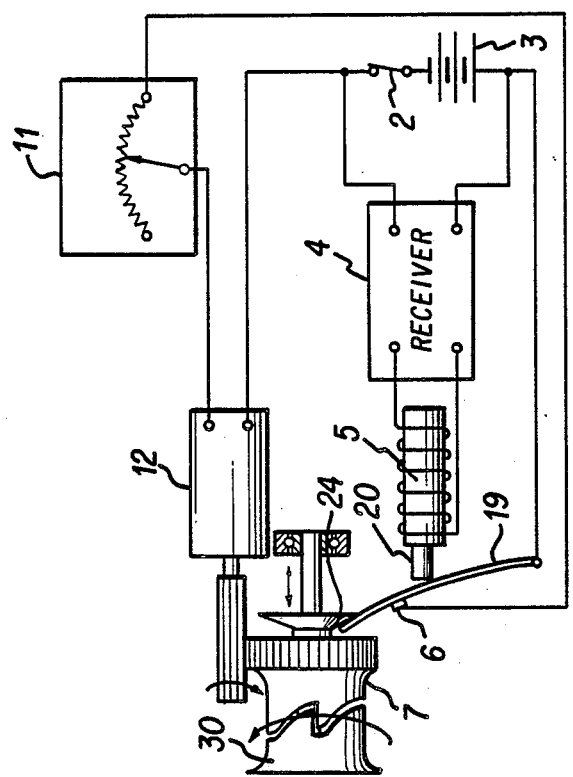
FIG. 4 is a schematic drawing of the present invention showing the solenoid activated clutch in the engaged or on position.
Figure 3:
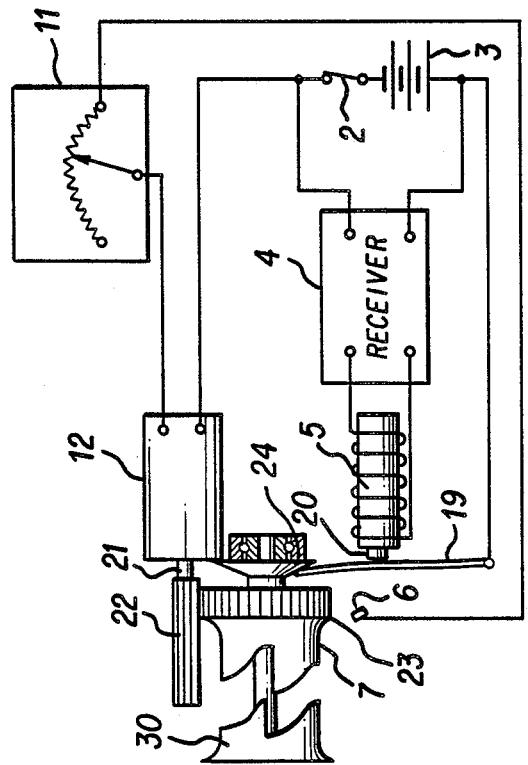
FIG. 3 is a schematic drawing of the present invention showing the solenoid activated clutch in the disengaged or off position.

FIG. 2 illustrates the actual construction of the device of the present invention which is contained within the case 15 illustrated in FIG. 1. A transmitter 1 of standard construction is provided to permit the transmission of a radio signal remotely from the transmitter to a small radio receiver 4. The radio receiver 4 receives electric power for its operation from a battery pack 3. A simple off-on switch at 2 is provided to permit the entire unit to be turned off when not in use. The radio receiver 4 is connected to a solenoid 5 which is provided with a piston rod 20. When the radio receiver 4 receives it's signal from remote transmitter 1 it closes the circuit between battery 3 and solenoid 5 to transmit electrical energy to the solenoid 5 to cause the solenoid rod 20 to be displaced out of the solenoid. When the electric energy to the solenoid is discontinued, the rod returns to its original position within the solenoid. It will be appreciated in this regard that the solenoid 5 and its associated rod 20 are of conventional design and consist essentially of an electromagnet having a hollow longitudinal cavity to accommodate an elongated cylindrical rod 20 which is made of a magnetic material and has suitable polarity to respond to the magnetic flux produced when the solenoid receives electrical energy. A spring plate 19 is provided with its lower end in a fixed position and engages the solenoid rod 20 at about its midpoint. This spring plate is preferably made of a conductive material and is connected to the electric power source 3. An additional electrical contact 6 is provided which engages the side of spring plate 19 when the plate is deflected toward it by the solenoid rod 20. Contact point 6 thereby provides a close circuit between the electric power source 3 and rheostat 11 when the solenoid is activated and spring plate 19 deflected. The top end of spring plate 19 engages clutch plate 24 as illustrated in FIGS. 2 through 4 of the drawings. As particularly shown in FIG. 3, when the solenoid 5 is inactive and solenoid rod 20 is in a position spring plate 19 is nearly vertical and does not engage contact 6. In this position the two sections 30 and 7 of the clutch mechanism are disengaged so that no rotational force is transmitted to the capstan 8. As shown in FIG. 4 of the drawings however, when the solenoid rod 20 is displaced out of the solenoid 5 to cause deflection of spring plate 19, clutch plate 24 and toothed spiral-jaw clutch cylinder are displaced to the left into engagement with the similarly toothed portion 30 of capstan 8 so that rotational force is transmitted to the capstan 8 to cause it to turn.

The rotational force which is transmitted through the gears 22 and 23 and controlled by clutch 7, is actually produced by electric motor 12 which receives its electric power from power source 3 through the variable rheostat 11 which, as previously described permits adjustment of the speed of rotation of shaft 21 by the motor 12.

Figure 5:
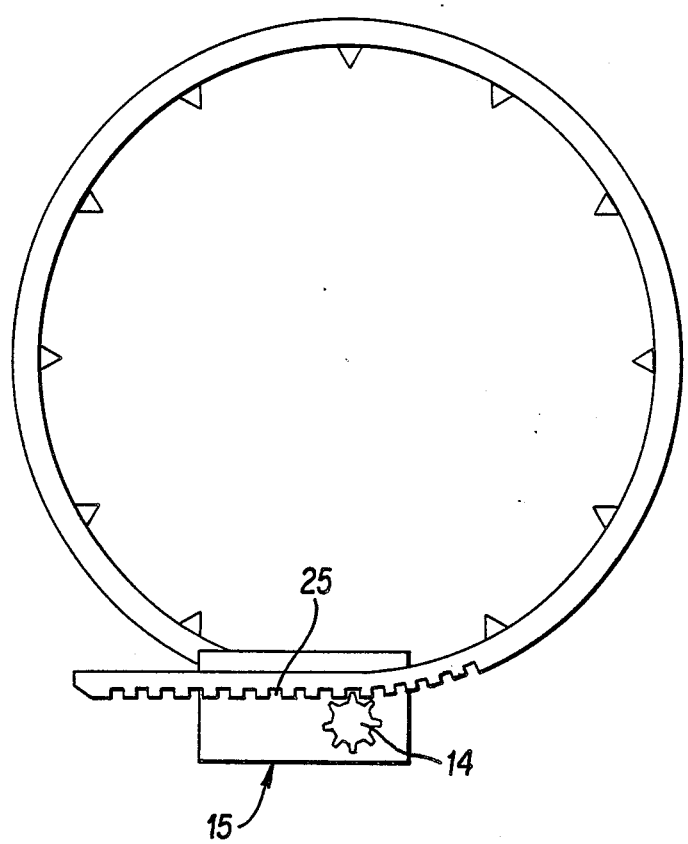
FIG. 5 is a cutaway side view showing one embodiment of the engagement of the pinch collar with the capstan of the invention.

As seen in FIG. 2 of the drawings, the capstan 8 can have several different configurations for tightening the collar of the device around the animals neck in response to the radio transmitted signal. As shown in FIG. 2A, the capstan 8 is provided with means for connecting cable 9 in such a way that turning of the capstan 8 will cause the cable to be wound around the capstan thereby shortening it and pulling the connectors 10 closer together. As further illustrated in FIGS. 6 and 7 of the drawings this pulling of the connectors 10 closer together has the effect of tightening or shortening the chain or collar around the neck of the animal. Alternatively, as illustrated in FIG. 2B of the drawings the capstan 13 is provided with a gear 14 which engages gear rack 25 on the end of pinch collar 18 as shown in FIG. 5 of the drawings. Rotation of the capstan thereby has the effect of shortening the length of the pinch collar thereby tightening it around the animals neck.

As also illustrated in FIGS. 6 and 7 of the drawings, various types of straps or chains commonly used in the art as obedience collars for training animals can be employed in the device of the present invention. FIG. 6 of the drawings for example illustrates the use of a flexible choke chain 16 which is provided on one location with a simple ring 26 through which choke chain 16 passes. The choke chain is attached to the cable connector 10 at its end 27 to the cable 9 which is itself attached to the capstan 8. Winding of the cable 9 around the capstan causes choke chain 16 to be drawn through the ring 26 thereby causing tightening of the chain around the neck of the animal. A similar construction is shown in use with a pinch collar 17 in FIG. 7 of the drawings.

It will of course be understood that the present invention can be modified by the inclusion or substitution of various devices and accessories known in the art as will be appreciated by those having ordinary skill in this technology. Such modifications and additions are considered to fall within the scope of the present invention as defined within the claims appended hereto.

I claim:

1. An adjustable animal training collar comprising in combination: a flexible strap at least a portion of which is adapted to encircle the neck of an animal, a radio receiver means for receiving a remotely broadcast radio signal and converting it to an on/off switching signal, an electric power source connected to an electric motor having a turning shaft which engages and turns a capstan connected to said strap such that turning of said capstan by said motor causes tightening of said strap around the neck of said animals, turning of said capstan being controlled by clutch means connected therewith and activated by switch means connected through said radio receiver to said power source to transmit power to said switch means on receipt of said on signal and to terminate said power on receipt of said off signal.

2. The training collar of claim 1 wherein said strap is connected to said capstan by a pair of flexible, elongated members which are each attached at one of their respective ends to spaced points on said strap and their other respective ends are attached to said capstan such that turning of said capstan causes said members to be wound on said capstan and to tighten said strap.

3. The training collar of claim 1 wherein a portion of said strap is provided with a rack of gear teeth which engage gear teeth provided on said capstan such that turning of said capstan causes shortening of the portion of said strap encircling the animal's neck.

4. The training collar of claim 1 in which means is provided on said collar to adjust the speed at which said capstan is turned.

5. The training collar of claim 4 wherein said adjusting means is a rheostat provided between said power source and said electric motor.

6. An animal training collar comprising an elongated, flexible strap adapted to encircle the neck of an animal and provided with means for tightening said strap around the animals neck on receipt of a remotely provided signal, said tightening means including an electric motor with a turning shaft and means for transmission of rotational force from said shaft to said strap, an electric power source for said motor and a radio receiver for receiving said signal, and controlling said transmission of rotational force, receipt of said signal thereby causing tightening of said strap.

7. The training collar of claim 6 wherein said transmission means includes a rotating capstan means for causing said tightening.

8. The training collar of claim 7 wherein said capstan means has attached to it two flexible, elongated connectors each of which has one end attached to said strap and its other end attached to said capstan such that turning of said capstan winds said connectors thereon and causes said tightening of the strap.

9. The training collar of claim 8 wherein said capstan is provided with gear teeth which engage a rack of gear teeth on said strap such that turning of said capstan causes shortening of the portion of said strap encircling the animals neck.

10. The training collar of claim 6 wherein said transmission means included a clutch means activated by a solenoid connected to said radio receiver, for controlling said transmission of rotational force on receipt of said signal.

* * * * *